(12) United States Patent
Mikami et al.

(10) Patent No.: US 7,224,318 B2
(45) Date of Patent: May 29, 2007

(54) ANTENNA APPARATUS AND METHOD FOR MOUNTING ANTENNA

(75) Inventors: Seishin Mikami, Toyota (JP); Toru Yamazaki, Chita (JP); Katsuhiro Ohara, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/603,342

(22) Filed: Jun. 25, 2003

(65) Prior Publication Data

US 2004/0008143 A1 Jan. 15, 2004

(30) Foreign Application Priority Data

Jun. 28, 2002 (JP) ............................. 2002-190369

(51) Int. Cl.
*H01Q 1/32* (2006.01)
*H01Q 9/04* (2006.01)

(52) U.S. Cl. ............................. 343/713; 343/700 MS; 343/712; 343/725; 343/769; 343/752; 343/789; 343/830

(58) Field of Classification Search ......... 343/700 MS, 343/712–713, 727, 741, 728, 702, 726, 853, 343/725, 789, 746, 847, 848, 785, 769, 752, 343/828–830, 846

See application file for complete search history.

(56) References Cited

U.S. PATENT DOCUMENTS

| 4,623,895 | A | * | 11/1986 | Bowering ................... 343/829 |
| 4,760,402 | A | * | 7/1988 | Mizuno et al. ............. 343/713 |
| 4,835,538 | A | * | 5/1989 | McKenna et al. ... 343/700 MS |
| 4,835,541 | A | * | 5/1989 | Johnson et al. ............. 343/713 |
| 4,907,006 | A | * | 3/1990 | Nishikawa et al. .. 343/700 MS |
| 5,146,232 | A | * | 9/1992 | Nishikawa et al. ......... 343/713 |
| 5,300,936 | A | * | 4/1994 | Izadian ................ 343/700 MS |
| 5,392,053 | A | * | 2/1995 | Hirata et al. ......... 343/700 MS |
| 5,471,221 | A | * | 11/1995 | Nalbandian et al. . 343/700 MS |
| 5,539,418 | A | * | 7/1996 | Egashira et al. ............ 343/712 |
| 5,898,404 | A | * | 4/1999 | Jou ..................... 343/700 MS |
| 5,918,183 | A | * | 6/1999 | Janky et al. ............. 455/456.1 |
| 6,087,990 | A | * | 7/2000 | Thill et al. ........... 343/700 MS |
| 6,317,084 | B1 | * | 11/2001 | Chen et al. .......... 343/700 MS |

FOREIGN PATENT DOCUMENTS

| JP | 02-079502 | 3/1990 |
| JP | 02-298105 | 12/1990 |
| JP | 07-050517 | 2/1995 |
| JP | 08-023220 | 1/1996 |
| JP | 2000-114857 | 4/2000 |
| JP | 2000-183789 | 6/2000 |

* cited by examiner

*Primary Examiner*—Tho Phan
*Assistant Examiner*—Chuc Tran
(74) *Attorney, Agent, or Firm*—Harness, Dickey & Pierce, PLC (57) ABSTRACT

A planar antenna has a radiating element and a ground plate. A body of a vehicle has an internal edge that is formed by making a hole in the body. The planar antenna is located in the hole so that an imaginary plane of the internal edge is located between the radiating element and the ground plate. In such a structure, electric lines of force perpendicularly pass through the body beside the planar antenna. As a result, electric fields are maintained in the vertical direction even if the planar antenna is mounted on the vehicle. This maintains a horizontal directivity of the planar antenna.

9 Claims, 7 Drawing Sheets

FIG. 2A  Y-Z PLANE

FIG. 2B  X-Z PLANE

Y-Z PLANE

FIG. 7B
RELATED ART

X-Z PLANE

ANTENNA APPARATUS AND METHOD FOR MOUNTING ANTENNA

REFERENCE TO RELATED APPLICATIONS

This application is based on Japanese Patent Application No. 2002-190369 filed on Jun. 28, 2002, the contents of which are incorporated herein by reference.

BACKGROUND OF THE INVENTION

1. Field of the Invention

The present invention relates to an antenna apparatus and a method for mounting an antenna, and more particularly, to mounting a planar antenna, which includes a radiating element and a ground plate, on a vehicle.

2. Description of Related Art

A planar antenna has a radiating element and a ground plate, and is used as a vehicle-mounted antenna. When the planar antenna is installed in a vehicle, the ground plate is mounted on the body of the vehicle.

Figure 6A:
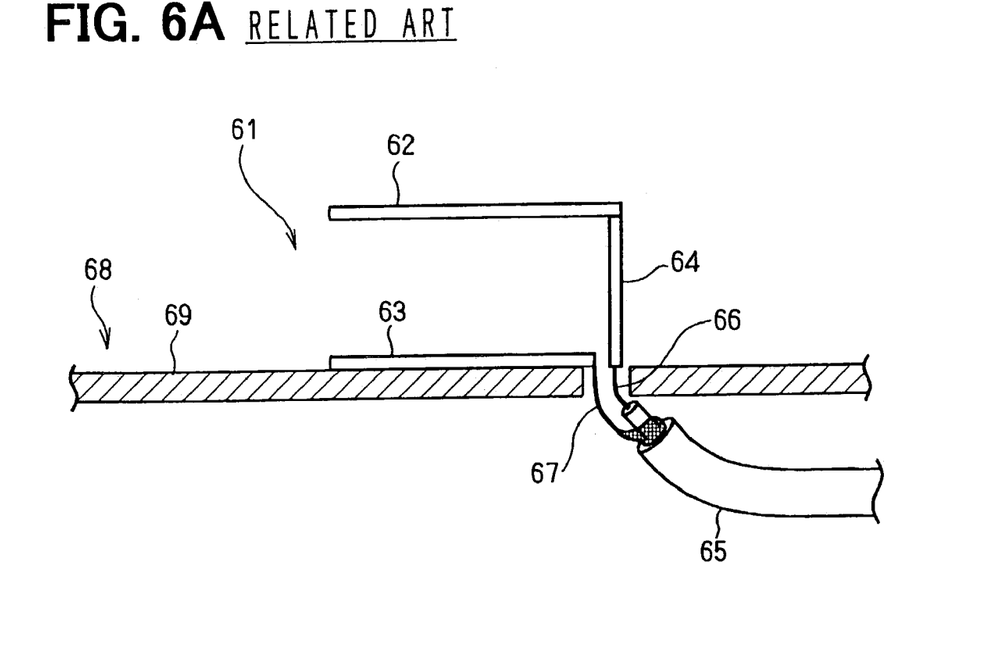
FIG. 6A shows a schematic cross-sectional view of a related art antenna apparatus.

Referring to FIG. 6A, a planar antenna 61 has a radiating element 62 and a ground plate 63. The radiating element 62 is connected to an inner conductor 66 of a coaxial cable 65 via a feeder 64. The ground plate 63 is connected to an outer conductor 67 of the coaxial cable 65. The ground plate 63 of the planar antenna 61 is mounted directly on the body 69 of a vehicle 68.

Figure 6B:
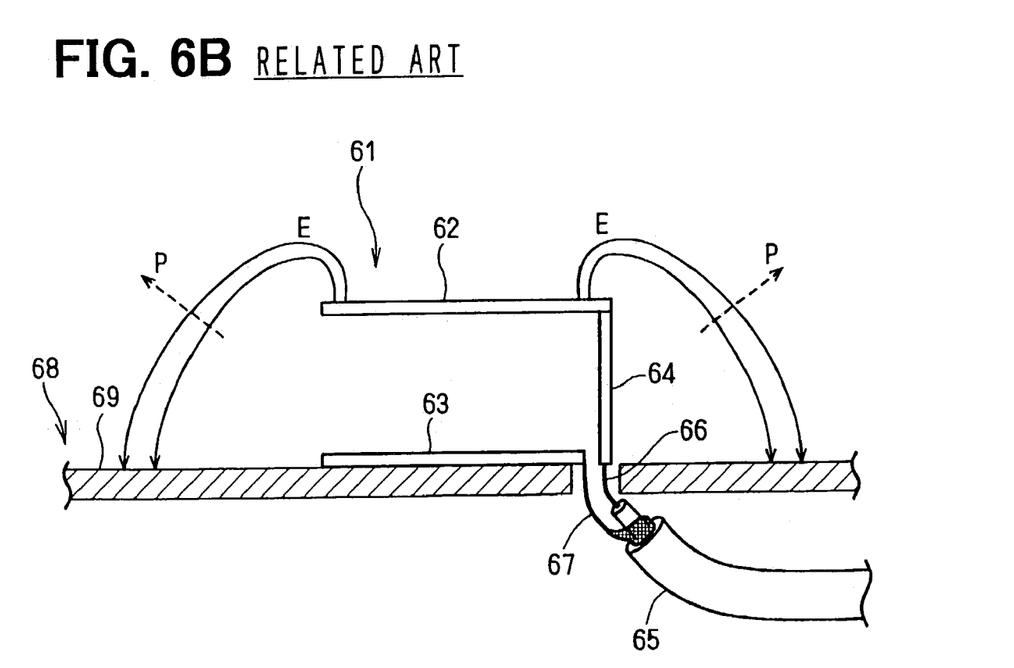
FIG. 6B shows electric lines of force of the related art antenna apparatus.

Referring to FIG. 6B, in such an antenna 61, electric lines of force, formed by electric fields, start perpendicularly on the radiating element 62, and end perpendicularly on the body 69 away from the planar antenna 61 (shown by solid line arrows E). This is because the electric lines begin and end perpendicularly to the charged surface, and the body 69 has the same electric potential as the ground plate 63. Accordingly, the electric fields in the vertical direction are reduced when the antenna 61 is mounted on the body 69.

Since antenna directivity is formed perpendicularly to the direction of the electric lines, directivity of the antenna 61 is shifted from a horizontal direction toward a vertical direction (shown by dotted line arrow P). As a result, the antenna 61 does not have an appropriate transmission gain in the horizontal direction.

SUMMARY OF THE INVENTION

The present invention has been made in view of the above problem, and an object of the present invention is to provide an improved antenna apparatus and an improved method for mounting an antenna that has an appropriate transmission gain in the horizontal direction.

According to one aspect of the present invention, an antenna apparatus includes a planar antenna that has a radiating element and a ground plate, and the planar antenna is mounted on the body of a vehicle. The body has an internal edge formed by making a hole in the body. The radiating element is positioned at one side of an imaginary plane inside of the internal edge, and the ground plate is positioned at the other side of the imaginary plane. The imaginary plane is a plane formed by the body of the vehicle that traverses the hole.

Electric lines of force start perpendicularly on the radiating element and end perpendicularly on the ground plate. The electric lines perpendicularly pass through the body beside the planar antenna. As a result, the electric fields are maintained in the vertical direction, and directivity of the antenna is maintained in the horizontal direction even if the planar antenna is mounted on a vehicle. This inhibits the directivity from shifting to a vertical direction, and improves the transmission gain in the vertical direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

The preferred embodiments of the present invention will be explained with reference to the accompanying drawings. In the drawing, the same numerals are used for the same components and devices.

[First Embodiment]

Figure 1A:
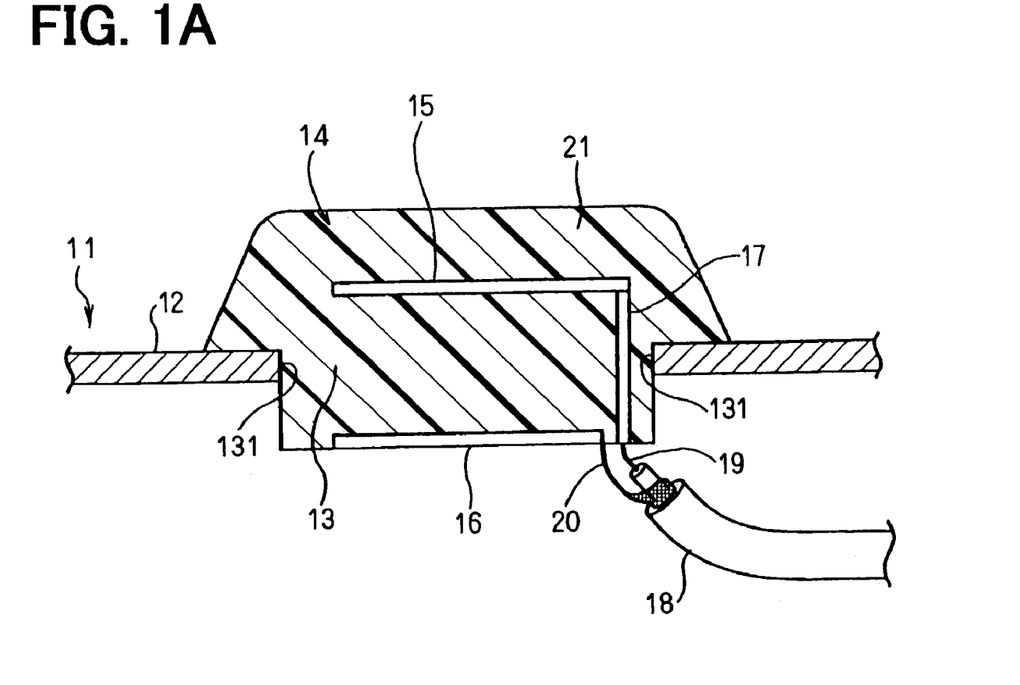
FIG. 1A shows a schematic cross-sectional view of an antenna apparatus according to a first embodiment.

Referring to FIG. 1A, a hole 13 is provided in the body 12 of a vehicle 11 at a position, such as a roof, a trunk or a hood that is convenient for installation of a planar antenna 14. The planar antenna 14 includes a radiating element 15 and a ground plate 16. The radiating element 15 is positioned above the body 12, and the ground plate 16 is positioned below the body 12. That is, the planar antenna 14 is mounted on the vehicle 11 so that the radiating element 15 is positioned at one side of an imaginary plane inside of an internal edge 131, and the ground plate 16 is positioned at the other side of the imaginary plane.

The radiating element 15 is connected to an inner conductor 19 of a coaxial cable 18 via a feeder 17. The ground plate 16 is connected to an outer conductor 20 of the coaxial cable 18. The radiating element 15, the ground plate 16, and the feeder 17 are molded by a resin 21. The resin 21 is fixed on the body 12 by a bonding substance (not shown), such as an adhesive, an adhesive tape or a bolt, to fill the hole 13. The resin 21 protects the radiating element 15, the ground plate 16, and the feeder 17, and fixes them while inhibiting moisture and dust from entering the vehicle 11 through the hole 13.

The planar antenna 14 is used for different kinds of devices, such as a transceiver for a cellular phone and a diversity receiver for a vehicle mounted cellular phone. The antenna 14 is also used for a Global Positioning System (GPS), a Vehicle Information and Communication System (VICS), Dedicated Short Range Communication (DSRC), Electronic Toll Collection (ETC), a wireless Local Area Network (LAN). Further, the antenna 14 is used for a keyless entry system, a tire pressure monitoring system, a radio, and a television.

Figure 1B:
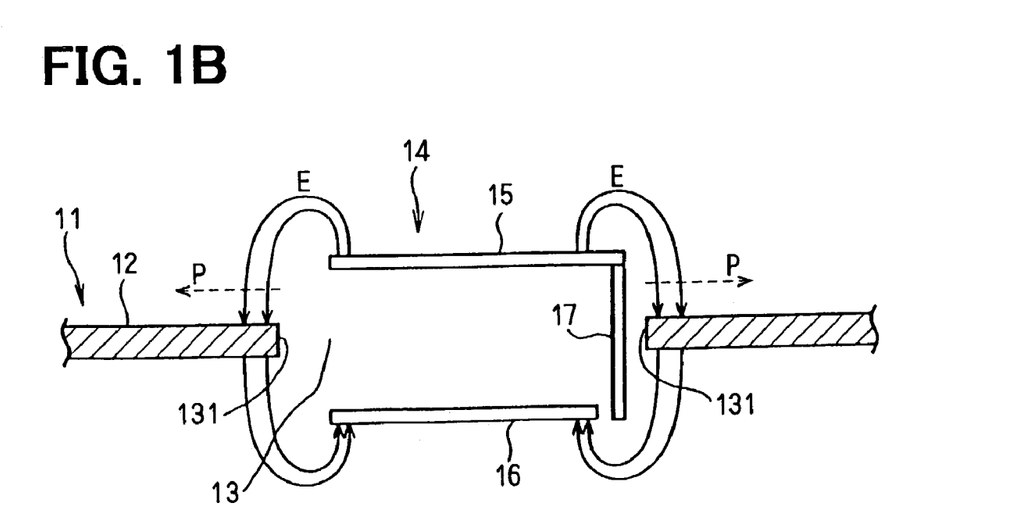
FIG. 1B shows electric lines of force of the antenna apparatus according to the first embodiment.

Referring, to FIG. 1B, electric lines of force formed by electric fields start perpendicularly on the radiating element 15 and end perpendicularly on the ground plate 16. The electric lines perpendicularly pass through the body 12 beside the planar antenna 14 (shown by solid line arrows E). As a result, the electric fields are maintained in the vertical direction, and directivity of the planar antenna 14 is maintained in the horizontal direction even if the planar antenna 14 is mounted on the vehicle 11 (shown by dotted line arrow P). This inhibits the directivity from shifting in the vertical direction. The coaxial cable 18 and the resin 21 are omitted from FIG. 1B to simplify the drawing.

The planar antenna 14 is mounted on the vehicle 11 according to the following steps. First, the hole 13 is bored in the body 12. Next, the planar antenna 14, which is molded by resin 21, is fitted into the hole 13 and is fixed to the body 12 by a bonding substance, such as an adhesive, an adhesive tape or a bolt. The inner conductor 19 of the coaxial cable 18 is connected electrically to the feeder 17. The outer conductor 20 of the coaxial cable 18 is also connected to the ground plate 16. The above steps can be shared by a plurality of workers, but may be operated by a single worker.

Figure 2A:
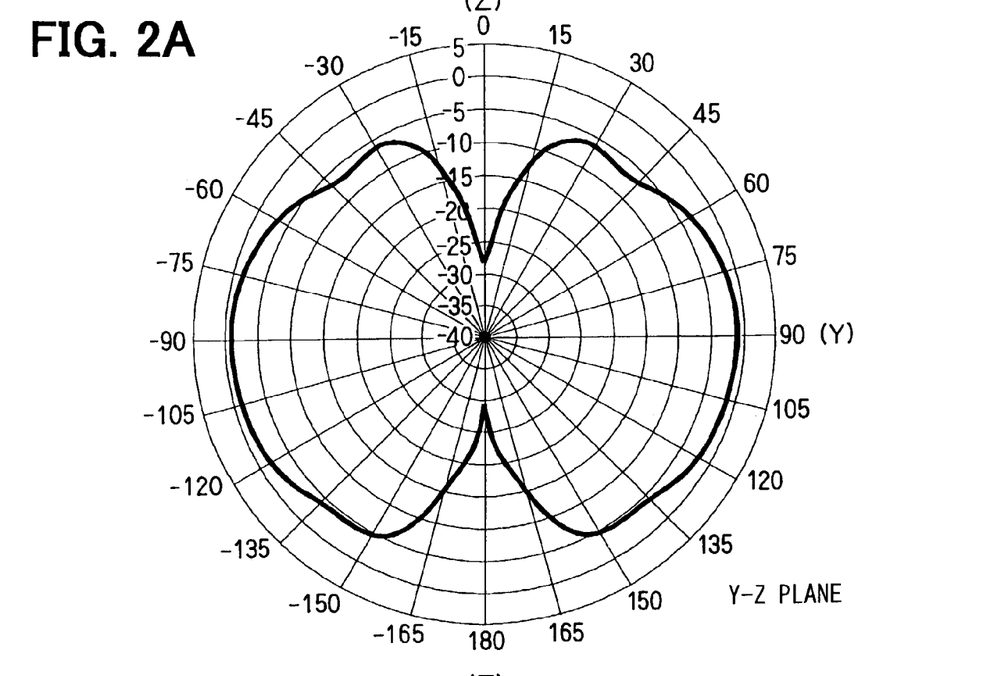
FIG. 2A shows a radiation pattern on Y-Z plane according to the first embodiment.
Figure 2B:
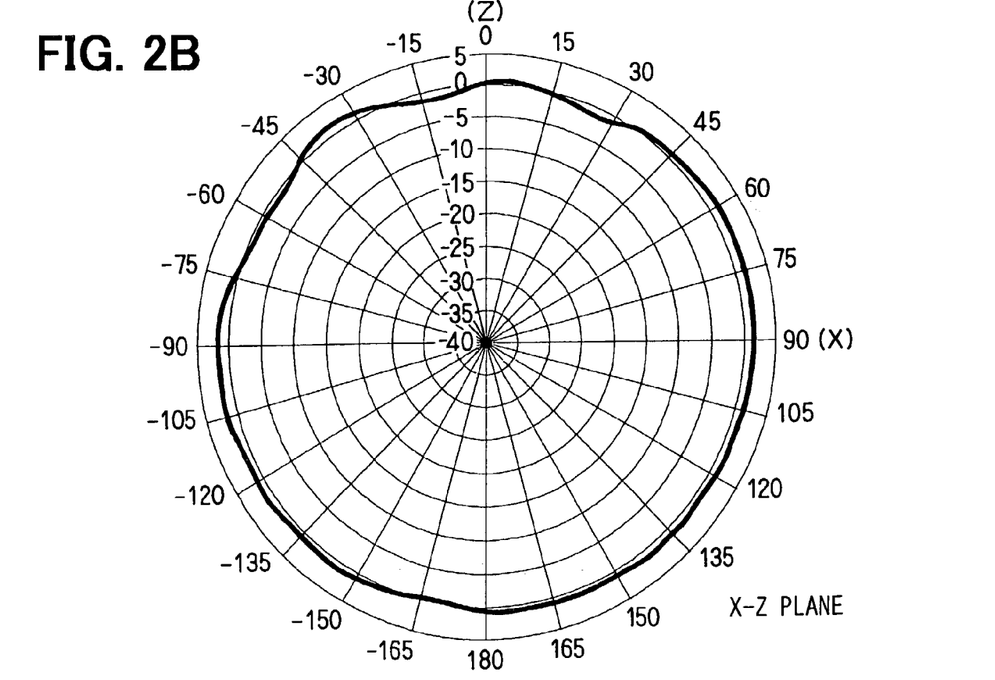
FIG. 2B shows a radiation pattern on X-Z plane according to the first embodiment.
Figure 7A:
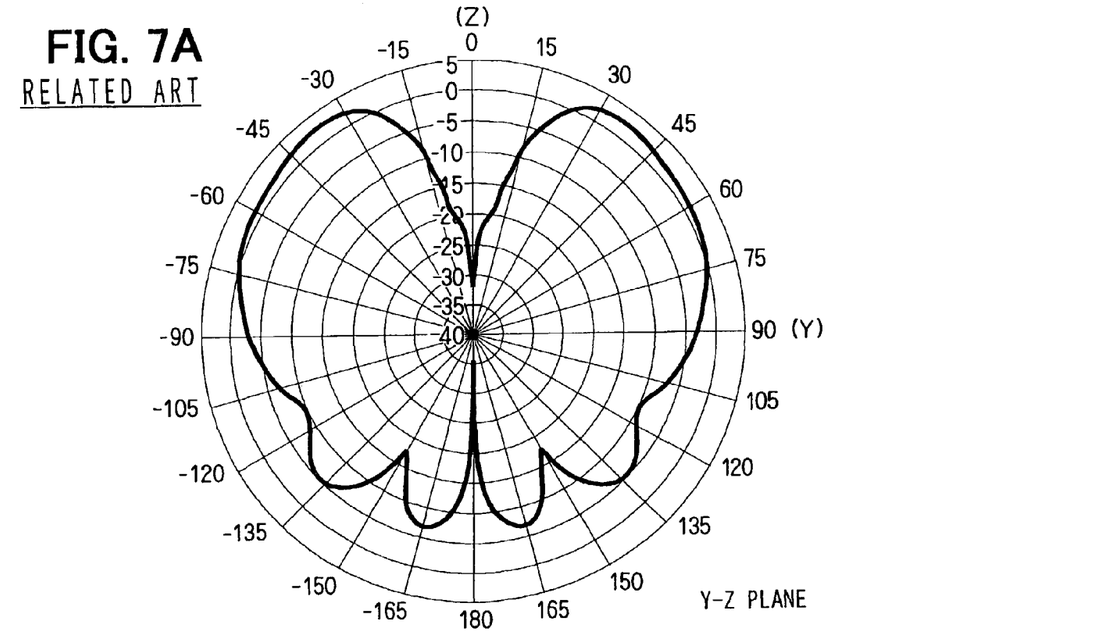
FIG. 7A shows a radiation pattern on Y-Z plane of the related art.
Figure 7B:
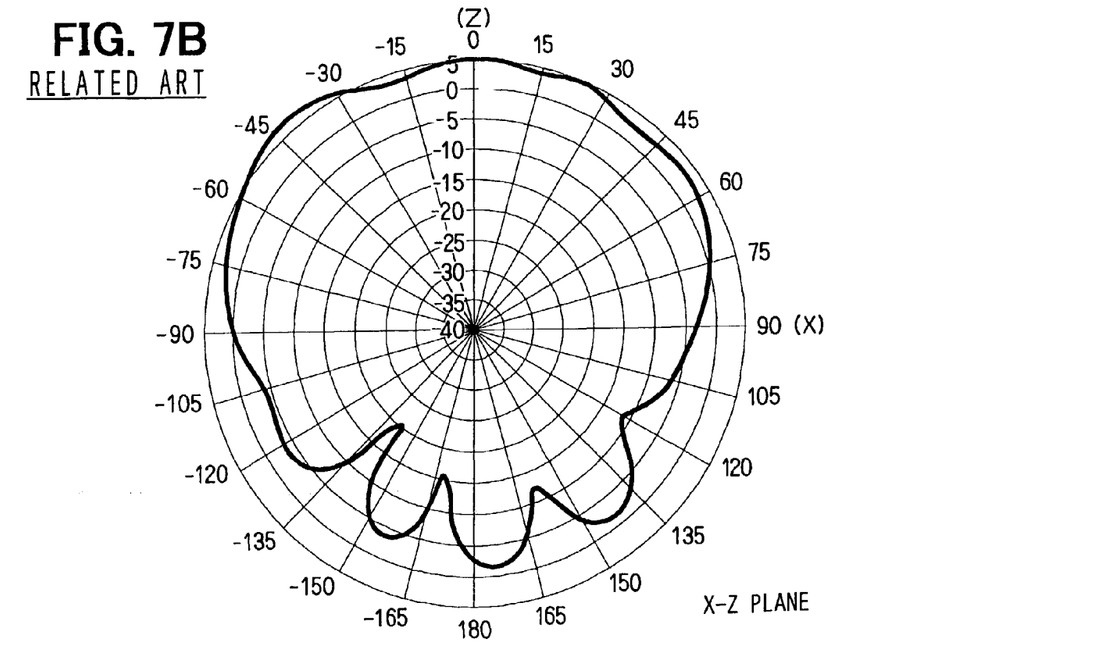
FIG. 7B shows a radiation pattern on X-Z plane of the related art.

FIG. 2A and FIG. 2B show radiation patterns, which were measured by the inventors, of the first embodiment, which is shown in FIG. 1A and FIG. 1B. On the other hand, FIG. 7A and FIG. 7B show radiation patterns of the related art, which is shown in FIG. 6A and FIG. 6B. FIGS. 1A and 1B show an improvement of the first embodiment with respect to a transmission gain in the horizontal direction compared with the related art.

FIG. 7A of the related art shows a radiation pattern on the Y-Z plane under the condition that the X-Y plane is horizontal. Dimension Y, which is an angle of 90 degrees and −90 degrees, shows the horizontal direction. A peak of the directivity is detected in directions shifted vertically from the horizontal. FIG. 7B shows the radiation pattern on the X-Z plane. Dimension X, which is an angle of 90 degrees and −90 degrees, shows the horizontal direction. A peak of the directivity is also detected in directions shifted vertically from the horizontal.

On the other hand, FIG. 2A shows the radiation pattern on the Y-Z plane with respect to the first embodiment. A peak of directivity is detected in a horizontal direction and is not shifted from a horizontal direction. FIG. 2B shows the radiation pattern on the X-Z plane and the peak of the directivity is not shifted from the horizontal direction. These measurements of the first embodiment show an improvement of the transmission gain in the horizontal direction compared with the related art.

According to the first embodiment, the planar antenna 14 has a radiating element 15 and a ground plate 16, and the planar antenna 14 is mounted on the body 12 of the vehicle 11. The body 12 has the internal edge 131 formed by making the hole 13 in the body 12. The radiating element 15 is positioned at one side of an imaginary plane inside of the internal edge 131, and the ground plate 16 is positioned at the other side of the imaginary plane. Electric lines of force start perpendicularly on the radiating element 15 and end perpendicularly on the ground plate 16. The electric lines perpendicularly pass through the body 12 beside the planar antenna 14. As a result, the electric fields are maintained in the vertical direction, and directivity of the planar antenna 14 is maintained in the horizontal direction even if the planar antenna 14 is mounted on the vehicle 11. This inhibits the directivity from shifting in the vertical direction, while improving the transmission gain in the vertical direction.

[Second Embodiment]

Figure 3A:
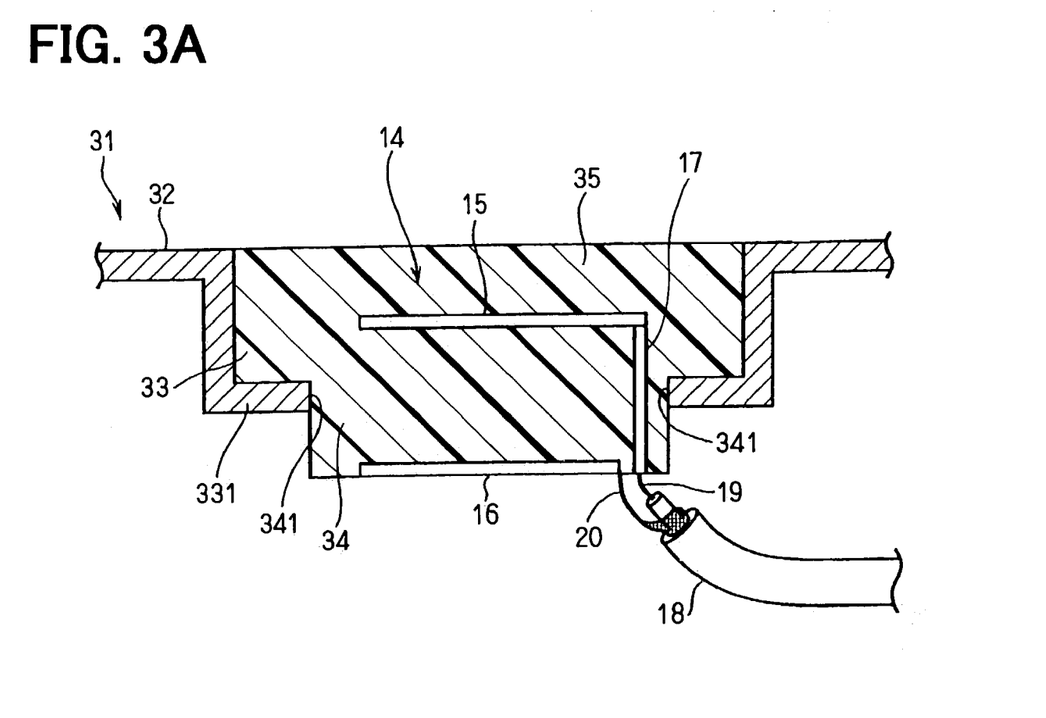
FIG. 3A shows a schematic cross-sectional view of an antenna apparatus according to a second embodiment.

In the second embodiment, referring to FIG. 3A, a concavity 33 is formed in the body 32 of a vehicle 31, and a hole 34 is bored in a bottom plate 331 of the concavity 33. The bottom plate 331 has an internal edge 341 formed by boring the hole 34. The concavity 33 and the hole 34 are provided in the body 32 at a position, such as a roof, a trunk or a hood that is convenient for installation of the planar antenna 14 as in the first embodiment.

The radiating element 15 is positioned between an imaginary surface of the body 32 and the hole 34, and the ground plate 16 is positioned below the bottom plate 331. That is, the planar antenna 14 is mounted on the vehicle 31 so that an imaginary plane inside of the internal edge 341 is located between the radiating element 15 and the ground plate 16. The radiating element 15, the ground plate 16, and the feeder 17 are molded by a resin 35.

Figure 3B:
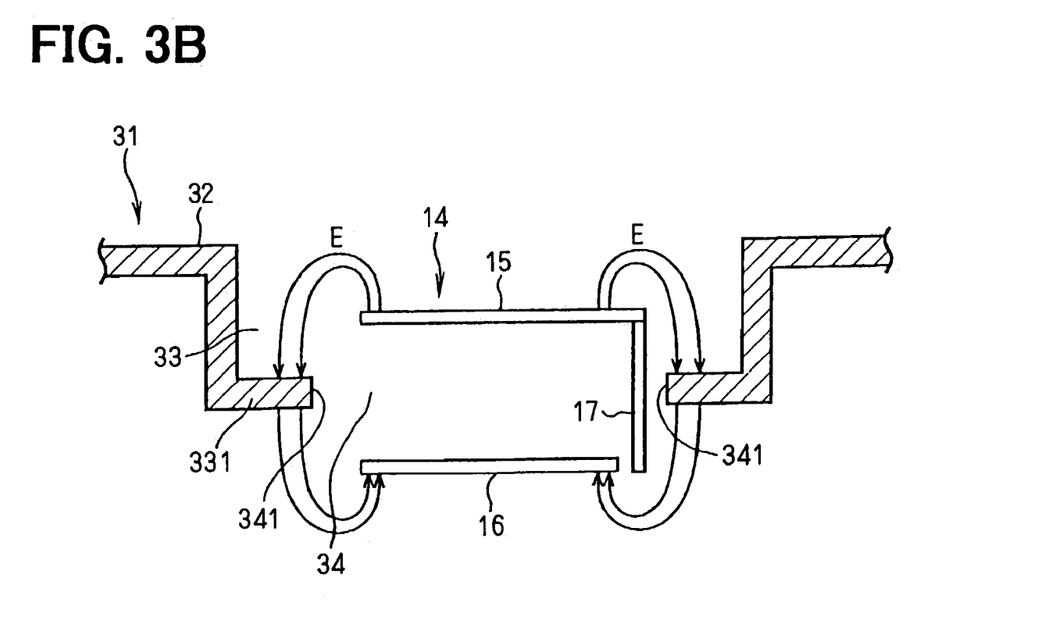
FIG. 3B shows electric lines of force of the antenna apparatus according to the second embodiment.

Referring to FIG. 3B, the electric lines of force formed by the electric fields start perpendicularly on the radiating element 15 and end perpendicularly on the ground plate 16. The electric lines perpendicularly pass through the bottom plate 331 of the concavity 33 beside the planar antenna 14 (shown by solid line arrows E). As a result, the electric fields are maintained in the vertical direction, and directivity of the planar antenna 14 is maintained in the horizontal direction even if the planar antenna 14 is mounted on the vehicle 31. This inhibits the directivity from shifting in the vertical direction.

Figure 4A:
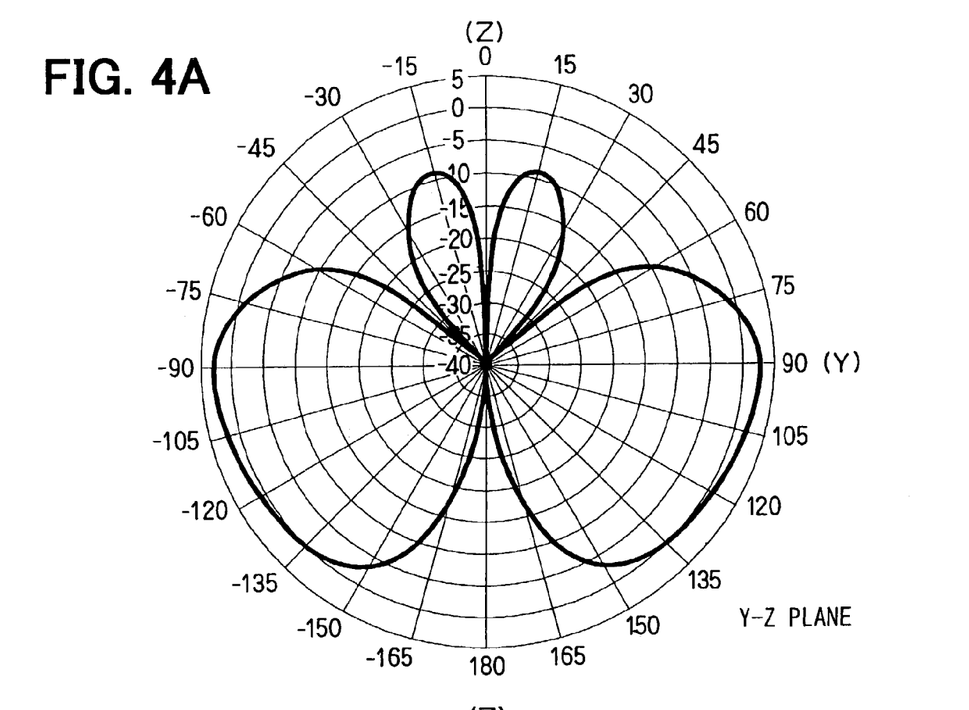
FIG. 4A shows a radiation pattern on Y-Z plane according to the second embodiment.
Figure 4B:
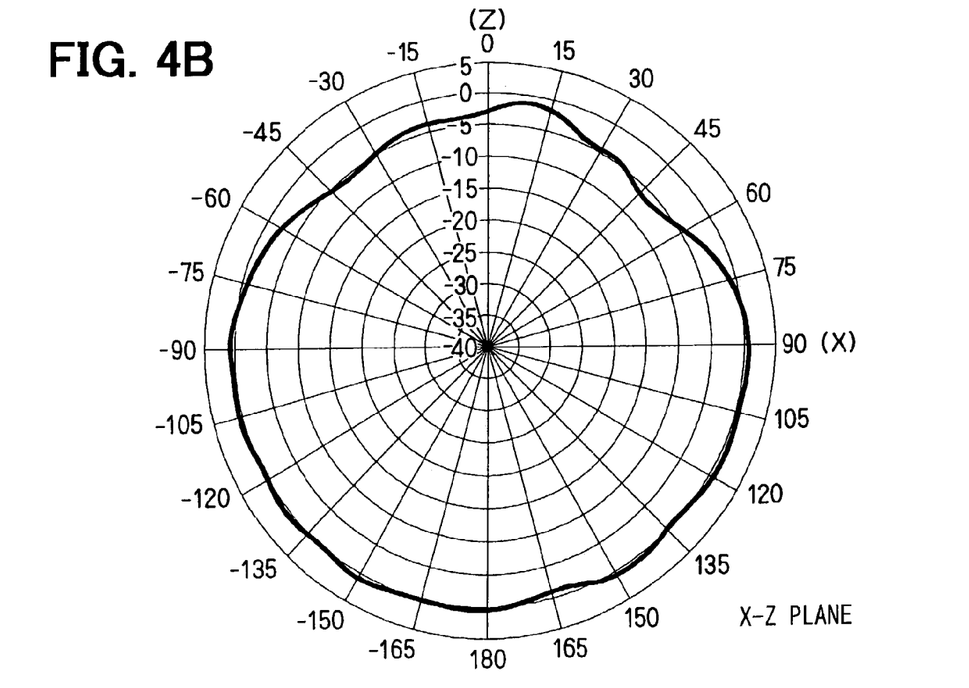
FIG. 4B shows a radiation pattern on X-Z plane according to the first embodiment.

FIG. 4A and FIG. 4B show radiation patterns, which were measured by the inventors, of the second embodiment, which were created in accordance with FIG. 3A and FIG. 3B. These figures of the second embodiment show an improvement of the horizontal transmission gain compared with the related art.

FIG. 4A shows the radiation pattern on the Y-Z plane with respect to the second embodiment. The peak of the directivity is detected in horizontal directions and is not shifted from the horizontal directions. FIG. 4B shows the radiation pattern on the X-Z plane, and the peak of the directivity is not shifted from the horizontal directions. These measurements of the second embodiment show an improvement of the transmission gain in the horizontal direction compared with the related art.

According to the second embodiment, the body 32 has the concavity 33 in the body 32 and the internal edge 341 is formed by making the hole 34 in the concavity 33. The radiating element 15 is positioned between the imaginary surface of the body 32 and the hole 34, and the ground plate 16 is located below the bottom plate 331. The electric lines of force formed by the electric fields start perpendicularly on the radiating element 15 and end perpendicularly on the ground plate 16. The electric lines perpendicularly pass through the bottom plate 331 beside the planar antenna 14. As a result, the electric fields are maintained in the vertical direction, and directivity of the planar antenna 14 is maintained in the horizontal direction even if the planar antenna 14 is mounted on the vehicle 31. This inhibits the directivity from shifting to the vertical direction, while improving the transmission gain in the vertical direction, as in the first embodiment.

In addition, since the radiating element 15 of the planar antenna 14 is positioned in the concavity 33, the planar antenna 14 does not protrude over the surface of the body 32. Therefore, the planar antenna 14 is embedded in the body 32 and improves the appearance of the vehicle 31.

[Third Embodiment]

Figure 5A:
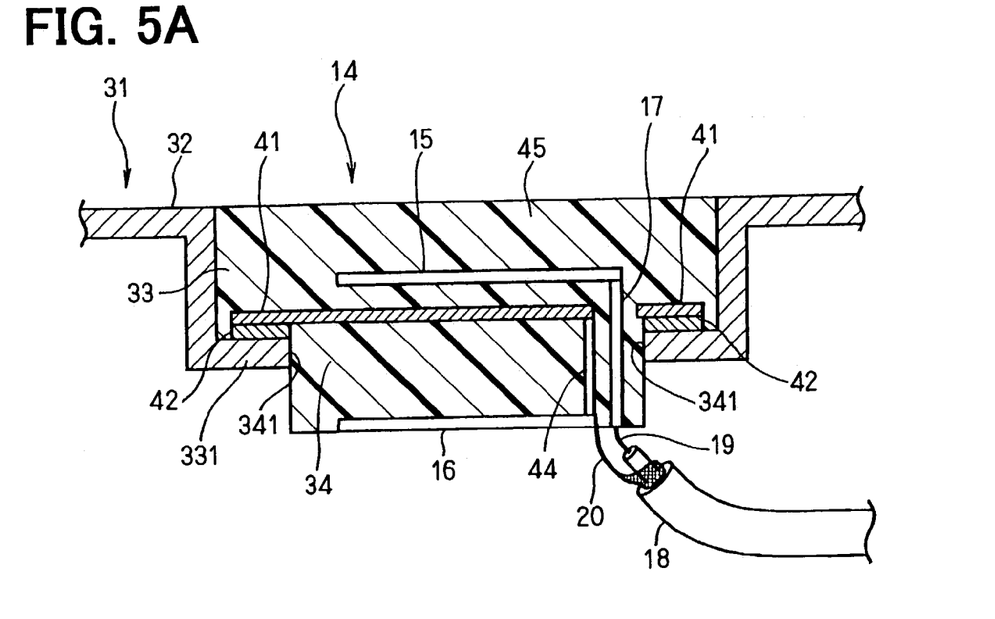
FIG. 5A shows a schematic cross-sectional view of an antenna apparatus according to a third embodiment.

Referring to FIG. 5A, in the third embodiment, by comparison with the second embodiment, the planar antenna 14 has a metal plate 41 and an electrical connection element 42. The metal plate 41 is positioned between the radiating element 15 and the ground plate 16. The electrical connection element 42 is positioned between the metal plate 41 and the bottom plate 331 of the concavity 33. The metal plate 41 is connected electrically to the body 32 of the vehicle 31 via the electrical connection element 42. The electrical connection element 42 is made of a metal or a dielectric, such as a resin, for protecting the antenna 14, and rubber packing for waterproofing the antenna 14.

In addition, the planar antenna 14 has a metal element 44 that electrically connects the metal plate 41 to the ground plate 16. As, a result, the body 32, the metal plate 41, and the ground plate 16 are at the same electric potential. A resin 45 molds the radiating element 15, the ground plate 16, the feeder 17, the metal plate 41, the electrical connection element 42, and the metal element 44.

Figure 5B:
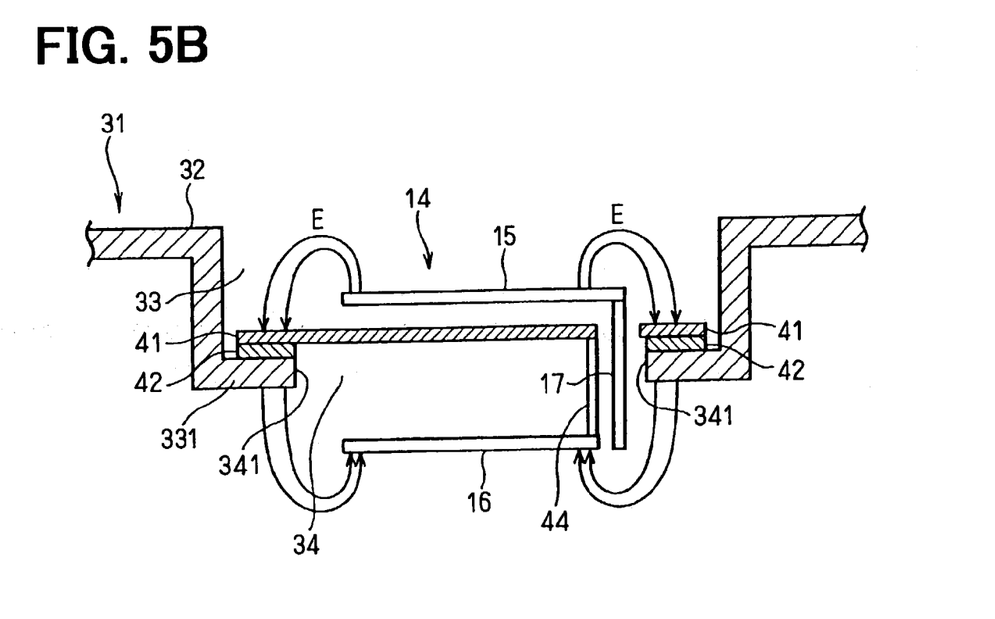
FIG. 5B shows electric lines of force of the antenna apparatus according to the third embodiment.

Referring to FIG. 5B, the electric lines of force formed by the electric fields start perpendicularly on the radiating element 15 and end perpendicularly on the ground plate 16. The electric lines perpendicularly pass through the metal plate 41 and the bottom plate 331 beside the planar antenna 14 (shown by solid line arrows E). As a result, the electric fields are maintained in the vertical direction, and directivity of the planar antenna 14 is maintained in the horizontal direction even if the planar antenna 14 is mounted on the vehicle 31. This inhibits the directivity from shifting in the vertical direction, while improving the transmission gain in the horizontal direction, as in the first and second embodiments.

In addition, before installing the planar antenna 14 in the vehicle 31, the metal plate 41 is assembled in a position between the radiating element 15 and the ground plate 16, and the resin 45 molds them together. When the planar antenna 14 is installed in the vehicle 31, an edge of the metal plate 41 is simply connected to the bottom plate 331, and it is not necessary to adjust the position of the radiating element 15, the ground plate 16, and the body 32. Accordingly, it is easy to adjust the position of the radiating element 15 and the ground plate 16 of the planar antenna 14 and the body 32 for maintaining horizontal directivity of the planar antenna 14 when mounted on the vehicle 31.

Since the metal plate 41 and the ground plate 16 are connected to the body 32 at the same electric potential, the metal plate 41 and the planar antenna 14 do not receive a noise signal radiated from the body 32. Accordingly, influence of the noise signal is reduced in the antenna 14.

If the electrical connection element 42 is made of a metal, the metal plate 41 and the body 32 are at the same electric potential because the metal plate 41 is connected to the body 32 via the electrical connection element 42. In such a case, low frequency components of a noise signal radiated from the body 32 do not influence the metal plate 41, and noise reduction of the low frequency component is provided to the planar antenna 14. If the electrical connection element 42 is made of a dielectric, a capacitor is formed by the metal plate 41 and the body 32, and the metal plate 41 and the body 32 are at the same electric potential via the dielectric. In such a case, high frequency components of a noise signal radiated from the body 32 do not influence the metal plate 41, and noise reduction of the high frequency component is provided to the planar antenna 14.

In addition, since the radiating element 15, the ground plate 16, and the metal plate 41 are molded by the resin 45, the radiating element 15, the ground plate 16 and the metal plate 41 are protected and fixed together.

The present invention should not be limited to the embodiments previously discussed and shown in the figures, but may be implemented in various ways without departing from the spirit of the invention. For example, in the third embodiment, the metal plate 41 may be directly connected to the bottom plate 331 of the body 32.

What is claimed is:

1. An antenna apparatus mounted in a through hole defined by a vehicle body made of metal, the through hole defining an imaginary planar body having a thickness equal to a thickness of the vehicle body disposed in the through hole and continuous with the vehicle body, the antenna apparatus comprising:
   a planar antenna having a radiating element and a ground plate, wherein
   the radiating element is spaced in one direction from one surface of the vehicle body, and
   the ground plate is spaced in an opposite direction from an opposite surface of the vehicle body such that the imaginary body is interposed between the radiating element and the ground plate.

2. The antenna apparatus according to claim 1, wherein:
   the vehicle body defines a concavity,
   the through hole is formed in the bottom of the concavity, and
   the radiating element is positioned in the concavity.

3. The antenna apparatus according to claim 1, further comprising:
   a metal plate positioned between the radiating element and the ground plate.

4. The antenna apparatus according to claim 3, wherein the vehicle body, the metal plate and the ground plate are electrically connected to each other to be at the same electric potential.

5. The antenna apparatus according to claim 4, wherein the vehicle body and the metal plate are connected by an electrical connection element.

6. The antenna apparatus according to claim 3, wherein the radiating element, the ground plate and the metal plate are molded by a resin.

7. A method for mounting a planar antenna on a vehicle, the planar antenna having a radiating element and a ground plate, the method comprising the steps of:
   boring a hole through a body of the vehicle, the hole defining an imaginary body having a thickness equal to a thickness of the body disposed in the hole and continuous with the body of the vehicle; and
   locating the planar antenna in the through hole so that the imaginary body is positioned between the radiating element and the ground plate.

8. An antenna apparatus mounted in a through hole defined by a metal attachment plate, the through hole defining an imaginary body having a thickness equal to a thickness of the metal attachment plate disposed in the through hole and continuous with the metal attachment plate, the antenna apparatus comprising:
- a planar antenna having a radiating element and a ground plate, wherein
- the radiating element is spaced in one direction from one surface of the metal attachment plate;
- the ground plate is spaced in an opposite direction from an opposite surface of the metal attachment plate such that the imaginary body is interposed between the radiating element and the ground plate; and
- the metal attachment plate is integral with a vehicle body.

9. An antenna apparatus mounted on a vehicle, the antenna apparatus comprising:
- a planar antenna having a radiating element and a ground plate; and
- a metal vehicular body, the vehicular body defining a through hole which has an internal edge and an imaginary body having a thickness equal to a thickness of the metal vehicle body that is disposed within the through hole and is continuous with the vehicular body,
- wherein the imaginary body is located between the radiating element and the ground plate.

* * * * *